US006438723B1

(12) United States Patent
Kalliojärvi

(10) Patent No.: US 6,438,723 B1
(45) Date of Patent: Aug. 20, 2002

(54) METHOD AND ARRANGEMENT FOR THE RELIABLE TRANSMISSION OF PACKET DATA

(75) Inventor: Kari Kalliojärvi, Veikkola (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/500,362

(22) Filed: Feb. 8, 2000

(30) Foreign Application Priority Data

Feb. 9, 1999 (FI) .................................................. 990250

(51) Int. Cl.[7] ........................... H03M 13/00; H04L 1/18
(52) U.S. Cl. ..................................................... 714/751
(58) Field of Search ........................ 714/751, 748–749, 714/18

(56) References Cited

U.S. PATENT DOCUMENTS

| 5,638,384 A | 6/1997 | Hayashi et al. ............. 714/752 |
| 5,844,918 A | 12/1998 | Kato ........................... 714/751 |
| 6,163,873 A | * 12/2000 | Murano ....................... 714/782 |

FOREIGN PATENT DOCUMENTS

| EP | 0 606 724 A1 | 7/1994 |
| EP | 0643510 A1 | 3/1995 |
| EP | 0876021 A1 | 11/1998 |

OTHER PUBLICATIONS

Chan et al., An adaptive hybrid FEC/ARQ protocol using Turbo Codes, IEEE, pp. 541–545, 1997.*
Decker, An adpative type–II hybrid ARQ/FEC protocol suitable for GSM, IEEE, pp. 330–333, 1994.*
"Viterbi Decoding Algorithm For Convolutional Codes With Repeat Request", Yamamoto et al., IEEE Transaction On Information Theory, vol. IT–26, No. 5, 1980.
"A Reliability Output Viterbi Algorithm With Applications To Hybrid ARQ", Raghavan et al., IEEE Transactions On Information Theory, vol. 44, No. 3, 1998.
"List and Soft Symbol Output Viterbi Algorithms: Extensions And Comparisions", Nill et al., IEEE Transactions On Communications, vol. 43, No. 2/3/4, 1995.

* cited by examiner

Primary Examiner—Albert DeCady
Assistant Examiner—Shelly A. Chase
(74) Attorney, Agent, or Firm—Perman & Green, LLP

(57) ABSTRACT

A method is provided for reliably receiving digital information from a transmitting device. The information to be received is arranged in discrete subunits (201, 202, 203, 204, 301, 302, 303, 304) so that a predetermined number of subunits correspond to a superunit (200, 300). It is encoded with a certain error detection code (402), corresponding to a certain error detection decoding method, and additionally with a certain error correction code (403), corresponding to a certain error correction decoding method. According to the invention a superunit is error correction decoded (405), and during the error correction decoding (405), the decoding reliability of each subunit of the superunit to be decoded is separately estimated. The error correction decoded superunit is error detection decoded (406), and during the error detection decoding it is detected, whether or not there were errors in the superunit to be decoded. Partial corrective action (407, 408, 409, 450, 451) is arranged for on the decoded superunit on the basis of the estimated reliabilities of the subunits.

22 Claims, 4 Drawing Sheets

METHOD AND ARRANGEMENT FOR THE RELIABLE TRANSMISSION OF PACKET DATA

TECHNOLOGICAL FIELD

The invention concerns generally the technology of using encoding, decoding and eventual retransmission for providing error-free communications over a noisy channel. Especially the invention concerns the selection and organisation of encoding and decoding in relation to the amount of data to be transmitted in the form of packets.

BACKGROUND OF THE INVENTION

Error detection codes are generally used to provide the receiver of digital information with adequate means for detecting, whether a certain piece of received digital information contained errors. An example of an error detection code is the addition of a CRC (Cyclic Redundancy Check) checksum to each piece of data of certain size. Error correction coding is used to enhance the probability of correct reception of digital information even when a noisy transmission channel is suspected to introduce errors. An example of error correction coding is the use of a convolutional encoder at the transmitting end and a Viterbi decoder at the receiving end. A more advanced example of error correction coding is the use of a turbo encoder at the transmitting end and an iterative turbo decoder at the receiving end. A coding scheme in which both error detection coding and error correction coding are applied to the same transmitted data is generally known as hybrid coding.

FIG. 1 illustrates a known example of transmitting packet data in a frame 100. In digital telecommunication systems it is customary to arrange the transmission of data in frames of constant duration, e.g. 10 ms. The capacity of a frame in bits depends on the modulation method employed, but is easily very large, like several thousands of bits. In the transmission of packet data it would often be incovenient and inefficient to arrange the data to be transmitted into such large packets. Instead, a smaller packet size is used and several consecutive packets are transmitted within a single frame. In FIG. 1 we see four packets 101, 102, 103 and 104 within the frame 100. The packets are also known as Protocol Data Units or PDUs.

According to a known hybrid coding scheme the transmitting device will first encode the packets 101, 102, 103 and 104 with an error detection code and then with an error correction code. Each packet is encoded separately. Both parts of the hybrid coding scheme introduce some overhead bits to the packets: an error detection code requires typically the calculation of a checksum which is added to the information bits, and an error correction code introduces some tail bits for the error correction code to terminate at a desired state at the end of the packet. FIG. 1 illustrates the overhead bits introduced through encoding schematically as a hatched block at the end of each packet. The overhead bits need not always be at the end of each packet. A typical transmitter will additionally interleave the encoded bits of the consecutive packets over a certain interleaving length, which most advantageously coincides with the length of the frame.

A typical receiver will first receive the whole encoded and interleaved frame and de-interleave it so that each packet is again separately accessible. Thereafter the receiver will apply Viterbi decoding, iterative decoding or corresponding error correction decoding to each packet to remove the error correction code and to reconstruct the packet (which is still in the error detection coded form) as realiably as possible. Finally the receiver will remove the error detection code and check, whether the packet contained errors. Those packets where errors are detected are put aside. If and when the communication connection allows for messaging in the return direction, the receiver will convey to the transmitter an ARQ or Automatic Repeat reQuest concerning the error-infected packets.

A large number of different practices are known for arranging for corrective retransmissions. An inefficient but simple alternative is to restart the transmission from the first encountered error. A more advanced alternative is selective retransmission in which only those frames or packets are retransmitted in which errors were detected. In an even more advanced version the selective retransmission does not contain an identical copy of the whole packet of frame but only some additional bits that should help the receiver to correct the detected errors. The receiver has also a number of alternative ways to handle the received retransmissions: basically it may either use the retransmitted information to replace the original one or it may apply some kind of maximal ratio combining to exploit essentially all information received so far in the reconstruction of the original packet.

The problem of the arrangement of FIG. 1 is the relatively large amount of overhead information that must be introduced at the encoding stage. A very natural basic rule is that the amount of overhead is directly proportional to the probability of immediate successful decoding but inversely proportional to the effiency of use of the available communication resources (time, bandwidth). A more detailed analysis shows that for example a convolutional code with a constraint length K (i.e. memory length K-1) requires K-1 tail bits to be added to the end of each independently encoded unit of information. From the theory of CRC codes it is known that an upper bound for the probability of an undetected error is in the order of $2^{-b}$ where b is the number of added CRC bits. The task of a system designer is to select the amount of overhead so that it strikes a desired balance between robustness and efficiency.

SUMMARY OF THE INVENTION

It is an object of the present invention to provide a method for transmitting packet data in frames with a good efficiency and acceptable robustness against errors. It is a further object of the invention to provide a transmitter and a receiver that take advantage of such a method.

The objects of the invention are achieved by using a hybrid coding scheme in which a common error detection code is applied to a first number of packets and an error correction code is separately applied to each group of a second number of packets, said second number being smaller than said first number.

The receiving method according to the invention requires that the information to be received

- is arranged in discrete subunits so that a predetermined number of subunits correspond to a superunit and
- is encoded with a certain error detection code, corresponding to a certain error detection decoding method, and additionally with a certain error correction code, corresponding to a certain error correction decoding method. The receiving method is characterised in that it comprises the steps of error correction decoding a superunit, during the error correction decoding, separately estimating the decoding reliability of each subunit of the superunit to be decoded, error detection decoding the error correction decoded superunit, during the error detection decoding, detecting whether or not there were errors in the superunit to be decoded, and if there were detected errors in the decoded superunit, arranging for partial retransmissions of the decoded superunit on the basis of the estimated reliabilities of the subunits.

The invention applies also to a transmission method having the characteristic steps of arranging the digital information to be transmitted into discrete subunits and composing a superunit from a predetermined number of subunits, encoding said superunit continuously with a certain error detection code corresponding to a certain error detection decoding method, encoding said superunit continuously with a certain error correction code, corresponding to a certain error correction decoding method, transmitting the encoded superunit from the transmitting device to the receiving device, error correction decoding said superunit, during the error correction decoding, separately estimating the decoding reliability of each subunit of the superunit to be decoded, error detection decoding the error correction decoded superunit, during the error detection decoding, detecting whether or not there were errors in the superunit to be decoded, and if there were detected errors in the decoded superunit, arranging for partial retransmissions of the decoded superunit on the basis of the estimated reliabilities of the subunits.

The invention applies further to a transmitting apparatus comprising buffering means for conjoining a predefined number of subunits of information into a superunit, error detection encoding means for error detection encoding the information to be transmitted, error correction encoding means for error correction encoding the information to be transmitted and retransmission means for providing retransmissions concerning selected portions of the information to be transmitted. The transmitting apparatus is characterised in that the error detection encoding means and error correction encoding means are arranged to encode completely conjoined superunits, the retransmission means are arranged to provide retransmissions concerning selected subunits and the transmitting device further comprises multiplexing means for multiplexing encoded conjoined superunits and retransmissions concerning selected subunits into transmission frames.

Additionally the invention applies to a receiving apparatus which is characterised in that it comprises error correction decoding means for error correction decoding a superunit and estimating the decoding reliability of each subunit contained within it, error detection decoding means for error detection decoding a superunit and detecting whether or not there were errors in it and retransmission control means for identifying, as a response to a nonzero number of errors detected in a decoded superunit, a predefined number of the subunits within the decoded superunit as suspicious on the basis of the estimated reliabilities of the subunits and for generating retransmission requests concerning the subunits identified as suspicious.

The invention relies on the fact that a decoder for decoding an error correction code is able to produce a so-called reliability metric which is an indication of the reliability of a certain performed decoding operation. In other words, after having decoded a certain piece of information the error correction code decoder may say that the decoding result represents the original piece of information with a certain probability. Some decoders may even give several alternative decoding results and their associated reliability metrics.

According to the invention, the reliability metric is utilised in the following way. For a relatively large amount of information there is a single error detection code. The same information is further encoded with an error correction code. Within said relatively large amount of information there are smaller subamounts of information. During the decoding process, a separate reliability metric is generated for each subamount of information. If the decoding of the error detection code indicates that the large amount of information contained an error or errors, the decoder expects that the error(s) appeared in those subamounts of information which had the lowest reliability metric. A retransmission will be requested for a selected number of those subamounts of information where the error(s) were likely to reside, or other corrective measures are taken to replace the erroneous data.

For selecting the "suspicious" subamounts of information several alternatives are available. The receiver may arrange all subamounts of information into an order of descending values of the reliability metric, use the error detection code to estimate the number of occurred transmission errors and ask for a retransmission concerning an equal number of subamounts of information from the bottom of the list. Another alternative is that the receiver will use the distribution of the reliability metrics and/or the estimated number of occurred transmission errors (if available) to establish a threshold value for the reliability metric to be acceptable, and ask for a retransmission concerning all those subamounts of information that fall under the threshold. Different combinations of these alternative methods are also available.

If the error correction decoder is of the type that provides, for a single subamount of information, a list of mutually alternative decoded sequences in a descending order of estimated decoding reliability, the invention allows for several operational alternatives. A natural choice is to select the sequence at the top of the list to be the primary representative for each subamount of information, and its reliability metric as the primary reliability metric for that subamount of information. If the error detection decoding of the large amount of information has indicated the presence of errors, suspicious subamounts of information are selected by using the primary reliability metrics as described above. For at least one selected suspicious subamount of information a number of the candidate sequences from the list may be tried first before asking for retransmissions.

According to an advantageous embodiment of the invention, the relatively large amount of information corresponds to a frame or other suitable assemblage of packets and a subamount of information corresponds to a packet.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 2:
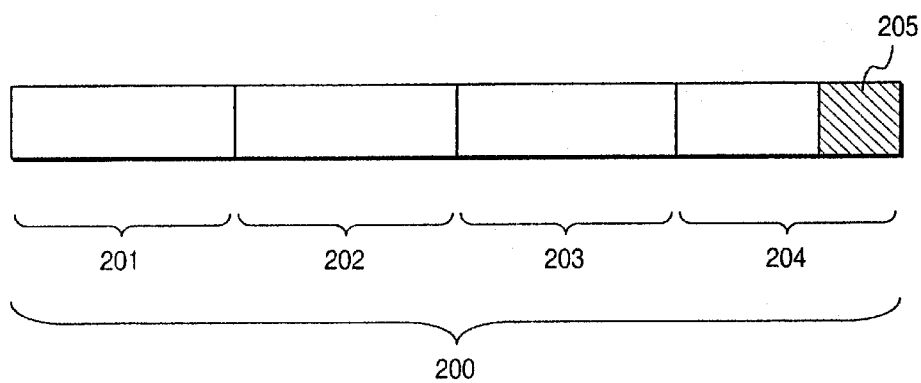
FIG. 2 illustrates an arrangement of encoded packets according to the invention.

FIG. 2 illustrates an encoded assembly of data to be transmitted according to the invention. For generality we will introduce the concept "superpacket" 200 to describe an assembly of data consisting of an integral number (greater than one) of essentially independent parts or "subpackets" 201, 202, 203 and 204. For the sake of example we may assume that each subpacket corresponds to a PDU to be transmitted in a packet data transmission network, and the superpacket is an assembly of consecutive PDUs, the combined duration of which in transmission corresponds to the duration of one frame. The invention is not limited to the framework of PDUs and frames, although such an embodiment of the invention is advantageous because it allows for the known definitions of information units to be applied in many packet data transmission systems. A two-level numbering scheme is most advantageously applied to unequivocally indicate a superpacket on one level and a single subpacket within the superpacket on the other: for example a subpacket known with a number 35/3 could be regarded as the third subpacket of the 35th superpacket.

Figure 1:
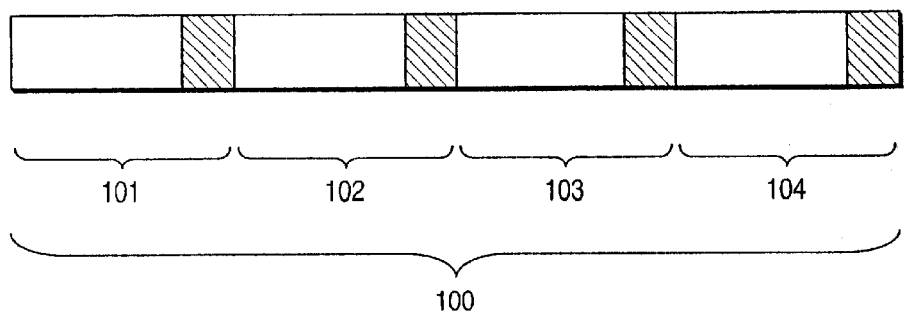
FIG. 1 illustrates a known arrangement of encoded packets into a frame.

FIG. 2 shows that the subpackets 201, 202 and 203 do not have any overhead bits directly contained within them. The last subpacket 204 contains some overhead bits which are schematically shown as a hatched block 205. The invention does not require that the overhead bits are located within the last subpacket at the end of it. An equally applicable embodiment of the invention is such where the superpacket comprises an integral number of consecutive subpackets of equal size, none of the subpackets containing overhead bits, and additionally a number of overhead bits located either at the end of the superpacket after the last subpacket or distributedly according to some arbitrarily chosen distribution scheme (which must be known both to the transmitter and the receiver) at the boundaries and/or in the middle of the subpackets. The invention covers even such an embodiment where the overhead bits belonging to a superpacket are distributed to reside inside the subpackets; such an embodiment would graphically resemble the prior art arrangement of FIG. 1, although the creation and purpose of the overhead bits would differ from prior art as we will explain in more detail below.

According to the invention, a transmitting device (which is generally understood to cover all such devices that are capable of outputting digital information in an encoded form) constructs a superpacket by putting together a predetermined number of subpackets. The subpackets are preferably consecutive packets from the digital representation of some larger entity of information to be transmitted. The transmitting device performs error detection coding by any method known as such, e.g. by calculating a certain CRC cheksum over the length of the whole superpacket and placing it at the end of the superpacket after the last subpacket. The transmitting device also performs error correction coding by conducting the error detection coded superpacket through some encoder known as such, e.g. a convolutional encoder or a turbo encoder. The error correction coding may necessitate the addition of tail bits at the end of the encoded superpacket; in the discussed exemplary embodiment these are contained in the hatched block 205 at the end of the encoded superpacket 200 in FIG. 2. According to the most advantageous embodiment of the invention the encoding operations of the superpacket do not pay any attention to the boundaries between the different subpackets.

A receiving device (which is generally understood to cover all such devices that are capable of inputting digital information in an encoded form) will receive the encoded superpacket 200 with the distinction that an arbitrary number of transmission errors may have occurred at arbitrary locations of the superpacket. The receiving device starts the decoding of the received and demodulated superpacket by removing the error correction code with some decoder that is known as such and corresponds to the encoder used in the transmitting device for applying the error correction code. As an example we will discuss a Viterbi decoder; with some other decoding methods it is possible to integrate the error correction decoding with demodulation. The idea of Viterbi decoding is to construct a so-called Trellis path through a number of allowed states of the signal to be decoded so that the probability of transmissions between allowed states reaches a maximum. The known structure of the convolutional encoder which was used to apply the error correction code dictates that from each state of the signal to be decoded there is a certain number of allowed transitions to following states, each of them being associated with an exact value of transition probability. By comparing the detected transition in the signal to be decoded against the allowed transitions and their probabilities the decoder will not only find the most probable route through the state transitions: it can also give an indication about the probability of a certain outputted decoded part of information being correctly reconstructed. For the purposes of the invention we will nominate this indication as the "reliability metric" for the decoded part of information.

Previously known methods for establishing a reliability metric for a certain piece of decoded information have been discussed for example in the publication H. Yamamoto, K. Itoh: "Viterbi Decoding Algorithms for Convolutional Codes with Repeat Request," IEEE Transactions on Information Theory, vol. IT-26, no. 5, pp. 540–547, Sep. 1980, which is incorporated herein by reference. A co-pending Finnish patent application FI 990249, "Menetelmä ja laite dekoodatun symbolisarjan luotettavuuden määrittämiseksi", introduces a novel and highly effective way of producing reliability metrics or sequence reliability statistics; said co-pending Finnish patent application is likewise incorporated herein by reference. The article A. R. Raghavan and C. W. Baum: "A Reliability Output Viterbi Algorithm with Applications to Hybrid ARQ", IEEE Transactions on Information Theory, vol. IT-44, no.3, pp. 1214–1216, May. 1998, also incorporated herein by reference, proposes another approach in which a conditional a posteriori probability is calculated for errors in the decoded sequence.

A so-called list decoding or look-up decoding approach is also known in which the Viterbi decoding algorithm will not give a single output sequence with the highest reliability value in the log-likelihood sense but a list of mutually alternative sequences in the order of diminishing estimated reliabilities. Such an approach is known from e.g. the patent publication EP 0 606 724 A1 and the article Nill et al.: "List and Soft Symbol Output Viterbi Algorithms: Extensions and Comparisons", IEEE Transactions on Communications, Vol. 43, No. 2/3/4, Feb./Mar./Apr. 1995. We will return later to the applications of list decoding in the context of the present invention.

Figure 3:
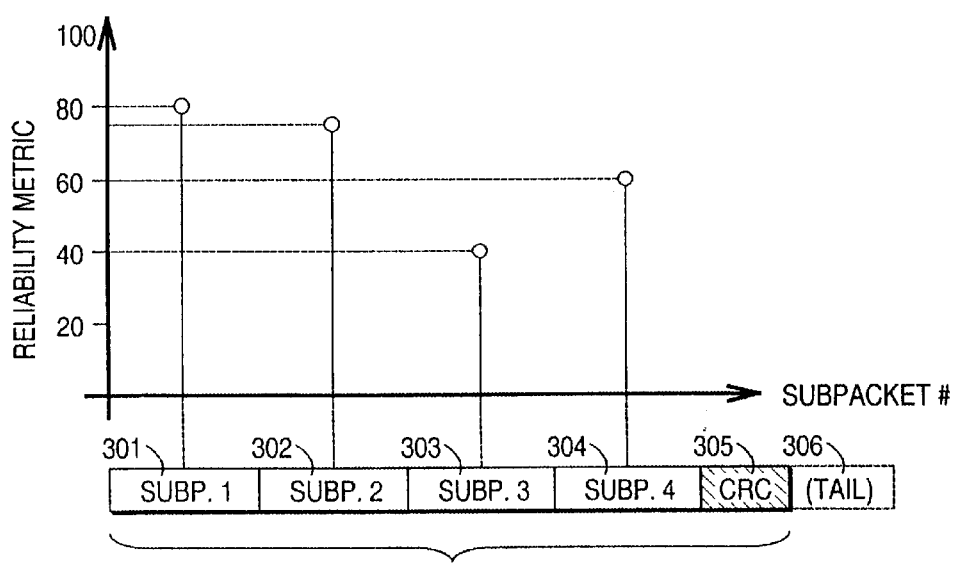
FIG. 3 illustrates a detail of a decoding phase according to the invention.

FIG. 3 illustrates a partly decoded superpacket 300 that consists of four consecutive subpackets 301, 302, 303 and 304 as well as a CRC checksum 305. With partial decoding we mean that the error correction code of the superpacket has been removed. The tail bits that were introduced for the error correction code to terminate at a desired state have been removed during the error correction decoding, hence the dashed block 306 at the end of the superpacket. During the error correction decoding it has been found that the reliability metric calculated for the first subpacket was 80 on some arbitrary scale from 0 to 100. The reliability metrics for the second 302, third 303 and fourth subpacket 304 were found to be 75, 40 and 60 respectively.

After having removed the error correction code and established the reliability metrics for the subpackets the receiving device tries to detect eventual errors in the superpacket by performing error detection decoding in a way known as such. For example a calculation of a CRC checksum and comparison of it against the one transmitted together with the superpacket may reveal that there are detected errors in the superframe. Some more advanced error detection decoding methods may even provide an estimate of the number of detected errors in the superframe. We will return to the application of such highly sophisticated error detection decodings later.

Regardless of whether the error detection decoding only yielded an indication of detected errors or even the number of them, at this stage the receiving device applies some predetermined rules for deducing in which subpacket(s) the detected errors should be. Given the exemplary reliability metrics of FIG. 3, there are two most probable alternatives: either all detected errors are within the third subpacket 303 because it has by far the lowest reliability metric, or a first number of the errors are within the third subpacket 303 and the rest of the errors are within the fourth subpacket 304 because these have the two lowest reliability metrics. We will return to the selection of the deduction rules below; for the purposes of the invention it suffices to know that the receiving device has some deterministic means for identifying the "suspicious" subpacket(s).

The invention does not limit the possibilities which the receiving device has for reacting to the identification of suspicious data packets. Usually it is the aim of packet data transmission to eliminate all transmission errors to an extent as large as possible, which requires that the receiving device must ask for a retransmission concerning the suspicious packets. The retransmission may obey any present or future retransmission rules ranging from restarting the transmission to applying the most advantageous selective retransmission and maximal ratio combining techniques. One advantageous retransmission arrangement is related to the use of the frame structure of the telecommunication system where the invention is to be applied; below we will explain such an arrangement in more detail. It is naturally also an alternative that the receiving device only marks the suspicious subpackets as error-infected, whereafter it is on the responsibility of the application exploiting the transmitted data to either use them despite of the potential errors, declare the subpackets null and void or try to correct or conceal the errors by interpolation methods or some other means.

Figure 4A:
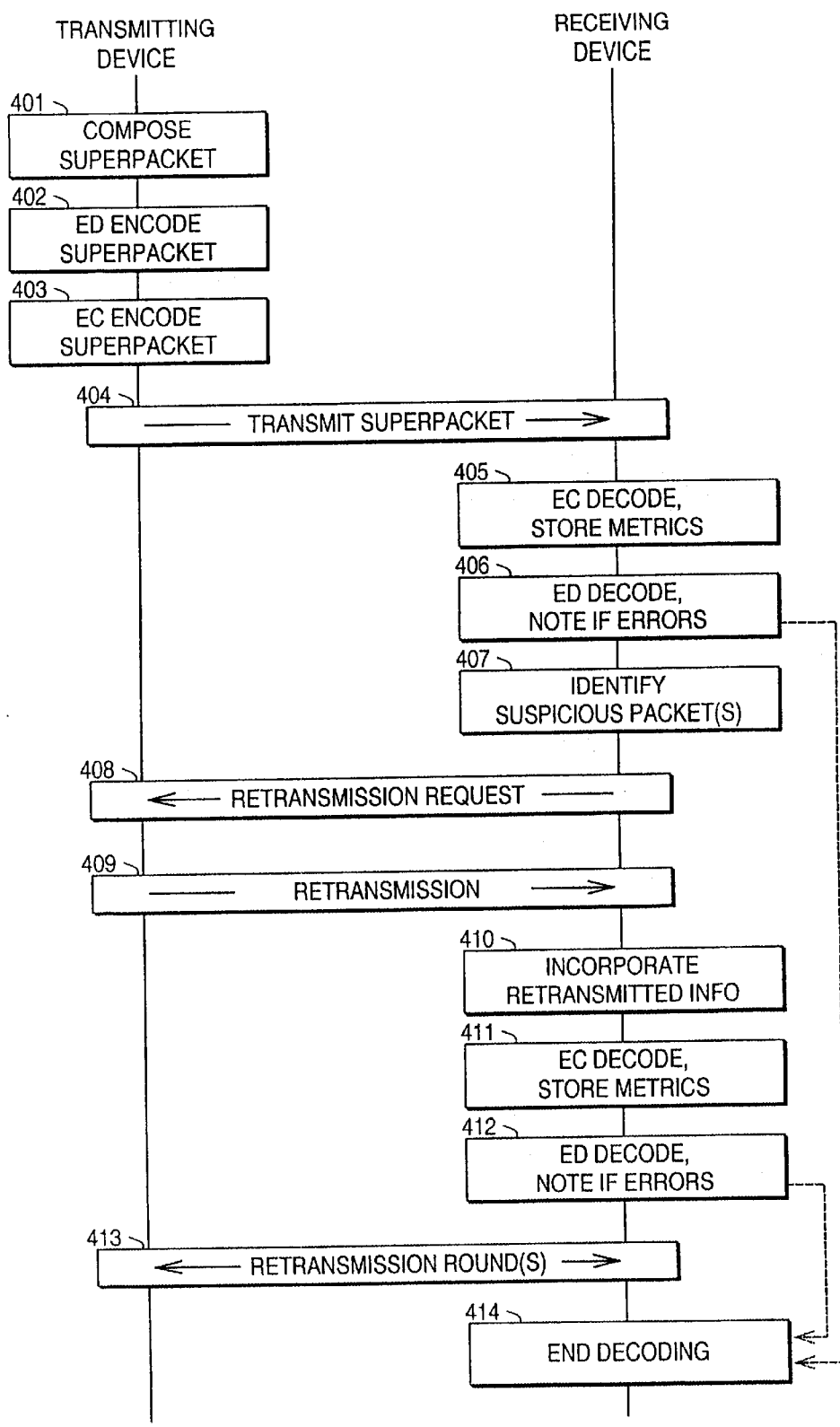
FIG. 4a is an overview of a method according to the invention.

FIG. 4a is an overview of a method according to the invention in the form of a flow diagram that shows the encoding, transmission and decoding of one superpacket as well as some potential retransmission attempts associated therein. Note that the invention is usually applied for the transmission of a piece of information that is far greater than the capacity of a single superpacket. In other words, the steps illustrated in FIG. 4a are repeated numerous times during a typical communication connection. The repetitions will be partly overlapping in time because during the retransmissions associated with a certain superpacket the original transmission(s) of subsequent superpacket(s) are already taking place.

At step 401 the transmitting device composes the superpacket by putting together an integral number of subpackets. Steps 402 and 403 correspond to the error detection coding and error correction coding of the superpacket respectively. At step 404 the encoded superpacket is transmitted from the transmitting device to the receiving device. Step 404 is understood to cover all such modulation, upconversion, downconversion and demodulation stages which are typical to radio or wireline communication but unessential for the scope of the present invention. At step 405 the receiving device removes the error correction code and notes the reliability metrics that correspond to the different subpackets. If a list decoding method is used, step 405 will contain the generation of a list of mutually alternative sequences with their associated reliability metrics for each subpacket, whereby the top sequence from each list and its associated reliability metric will be taken into consideration in the following. At step 406 the receiving device performs error detection decoding and possibly even notes the number of detected errors; in a simpler embodiment it suffices to note whether or not there were detected errors. Step 407 corresponds to the identification of the suspicious subpackets.

Let us first assume that no indication about the number of detected errors is available, meaning that the error detection decoding will just indicate whether or not errors were detected. Some advantageous alternative rules for the identification of the suspicious subpackets at step 407 are as follows:

1) Mean or median-based rules: the receiving device calculates the mean or median value of the reliability metrics, designated as M. All those subpackets are suspicious for which the reliability metric is less than or equal to J percent of M, where J is for example 80 or 100 or some other suitable predefined value found through experiment or simulation. As an alternative to the percentage definition, after having calculated M, the receiving device may investigate whether there is one or a few subpackets with reliability metrics remarkably differing from M. Subpackets with a remarkably low reliability metric may be declared as suspicious while the others are regarded as "clean"; or subpackets with a remarkably high reliability metric may be declared as being above suspicion while all others are subjected to retransmission.

2) Order of magnitude based rules: the receiving device arranges the subpackets into an order of ascending or descending values of their reliability metrics. A fixed number of subpackets from the low end of the list will always be regarded as suspicious, if the error detection decoding indicates the presence of errors. Said fixed number may be e.g. one or one half of the total number of subpackets in a superpacket.

3) Different number of subpackets declared as suspicious for different retransmission rounds.

For the first retransmission round, only the subpacket with the lowest reliability metric is suspicious.

If a second retransmission round is needed, the two subpackets with the lowest reliability metrics are suspicious.

Continuing in the similar fashion until on the Pth retransmission round, if needed, all subpackets are suspicious, where P is the total number of subpackets in a superpacket.

Let us then consider the exploitation of the estimated number of detected errors, if such information is available. We will designate the number of detected errors as N and the number of subpackets in the superpacket again as P. Some advantageous modified rules for the identification of the suspicious subpackets at step 407 are as follows:

1) Mean or median-based rules: the receiving device calculates the mean or median value of the reliability metrics, designated as M.

If $N \leq P/2$, all such subpackets are suspicious for which the reliability metric is less than or equal to 80 per cent of M.

If $P/2 < N \leq 2P$, all such subpackets are suspicious for which the reliability metric is less than or equal to M.

If $N > 2P$ or M is less than a predetermined threshold value, all subpackets all suspicious.

The limiting values in the above-given inequalities and percentages may be chosen differently; suitable limiting values are most advantageously found through simulation and/or experimentation.

2) Order of magnitude based rules: the receiving device arranges the subpackets into an order of ascending or descending values of their reliability metrics.

If $N \leq P/2$, only the subpacket with the lowest reliability metric is suspicious.

If $P/2 < N \leq 2P$, the lowest half (in the sense of reliability metrics) of the subpacket list is suspicious.

If $N > 2P$, all subpackets all suspicious.

Again the limiting values may be determined through simulation and/or experimentation.

Different combinations of the above-given rules are possible. Also other rules may be applied without departing from the scope of the present invention. A kind of limiting case is to declare all subpackets as suspicious every time when the decoding of the error detection code indicates the presence of errors, but in such a case the advantages gained through the present invention are lost to a very large extent.

Of course it may happen that at step 406 the receiving device does not detect any errors in the received and decoded superpacket. In that case it will bypass step 407 and go to the end of the decoding process as indicated by the dashed arrow.

At step 408 the receiving device generates and transmits a retransmission request and at step 409 the transmitting device generates the requested retransmission and transmits it to the receiving device. There are several alternatives for implementing these steps. We will describe here two very different alternatives which we designate as Type I and Type II retransmissions.

In Type I, the retransmission comprises an exact copy of each subpacket for which a retransmission was requested. The receiving device will then have the choice of either replacing each previously received subpacket with the new one or to use diversity combining (e.g. maximal ratio combining) to exploit the information content of both the originally received subpacket and its subsequently received copy or copies. The latter alternative is more effective in terms of successful reconstruction of the original information, but it requires more allocated memory and processing power.

In Type II, the retransmission comprises additional parity bits or some other information that should help the receiving device to successfully reconstruct the original information. This approach is particularly suitable if so-called Rate Compatible Punctured Convolutional Codes (RCPCCs) are used, meaning that the original transmission was composed by puncturing or leaving out some bits from the complete convolutionally encoded (mother code) original information and the requested retransmissions contain selected subsets of the punctured bits. The present invention is very advantageously applied together with retransmissions of Type II, because these work very well if the additional pieces of information transmitted in the retransmissions are small.

Step 410 corresponds to the receiving device incorporating the additional information received through the retransmissions into the decoding process. Depending on whether Type I or Type II (or some other type of) retransmissions are used, step 410 will take a different form: replacing whole parts of the previous information, diversity combining with the previous information or incorporating the additional parity bits into the decoding process. In any case, the receiving device will try to decode the superpacket once more in step 411 and detect any remaining errors in step 412. If errors are still detected, a new retransmission round begins. The new retransmission round as well as potential further retransmission rounds may each comprise a new round of identifying suspicious subpackets; alternatively the previously identified suspicious subpackets may be used. The retransmission round(s) are schematically represented by block 413. If at some step no errors were detected, the number of detected errors was found to be below a certain predetermined acceptance level (when the number of detected errors is available) or a timeout for the decoding for the present superpacket was reached, the process ends at step 414 by either outputting the error-free decoded superpacket or declaring an error, of which alternatives the latter applies to the time-out case.

We will next provide a specific example of applying the invention into a proposed Wideband Code Division Multiple Access (WCDMA) environment in the context of a digital cellular communication system of the third generation. We make the following assumptions: chip rate is 4.096 Mchip/s, modulation is QPSK (Quadrature Phase Shift Keying), length of the short spreading code is 32 meaning 128 ksymbols/s. A frame of 10 ms would then consist of 1280 QPSK symbols, i.e. 2560 bits. Each frame further consists of 16 slots, leaving 80 QPSK symbols per slot. Control information like pilot, power control, transport format indication and packet header information take about 10 to 15 percent of the symbol capacity. The basic unit of allocatable resources is the slot.

We will first assume the application of Type I retransmission. A superpacket could fit exactly into a frame and consist of 16 slots. A subpacket could cover 2 slots, giving 8 subpackets per superpacket. The original superpackets and the retransmission subpackets are put into the frame structure in a continuous fashion which always tries to completely fill up the frames to be transmitted. This means that the original transmission of a superpacket can be accomplished with two consecutive frames, with those parts of the frames thus left unused being filled up with retransmissions. The two-level numbering of subpackets referred to previously enables the receiving device to reconstruct the superpackets correctly. We may assume that each superpacket comprises 32 CRC bits, giving an upper bound for the probability of undetected errors as $2.3 \cdot 10^{-10}$ and no information about the exact number of detected errors (when greater than zero). A certain number of tail bits are required at the end of each superpacket. As a comparison we may calculate that a conventional arrangement according to the principle of FIG. 1 would require eight times as many tail bits and, assuming 16 CRC bits per packet, an upper bound for the probability of undetected errors as $8 \cdot 1.5 \cdot 10^{-5}$ or $1.2 \cdot 10^{-4}$ with four time as many CRC bits.

If Type II retransmission and the same 16-slot, 8-subpacket superpacket is assumed, the retransmission blocks that would carry additional parity information could take for example 2 slots. Retransmission could be arranged in 8 blocks of cumulatively adding number of additional parity bits resulting in effective code rates of approximately 0.8889, 0.8, 0.7273, 0.6667, 0.6154, 0.5714, 0.5333 and 0.5. As with the Type I arrangement, the actual physical layer frame structure can be filled continuously with the original superpackets and retransmission blocks so that the original transmission of a superpacket may take place in two consecutive frames.

Regardless of which rule(s) were used to identify the suspicious subpacket(s) at steps 406 and 407 of FIG. 4*a*, a round of list checks may come in between steps 407 and 408 if list decoding were used at step 405. We will briefly describe some advantageous measures related therewith by reference to FIG. 4*b*.

Figure 4B:
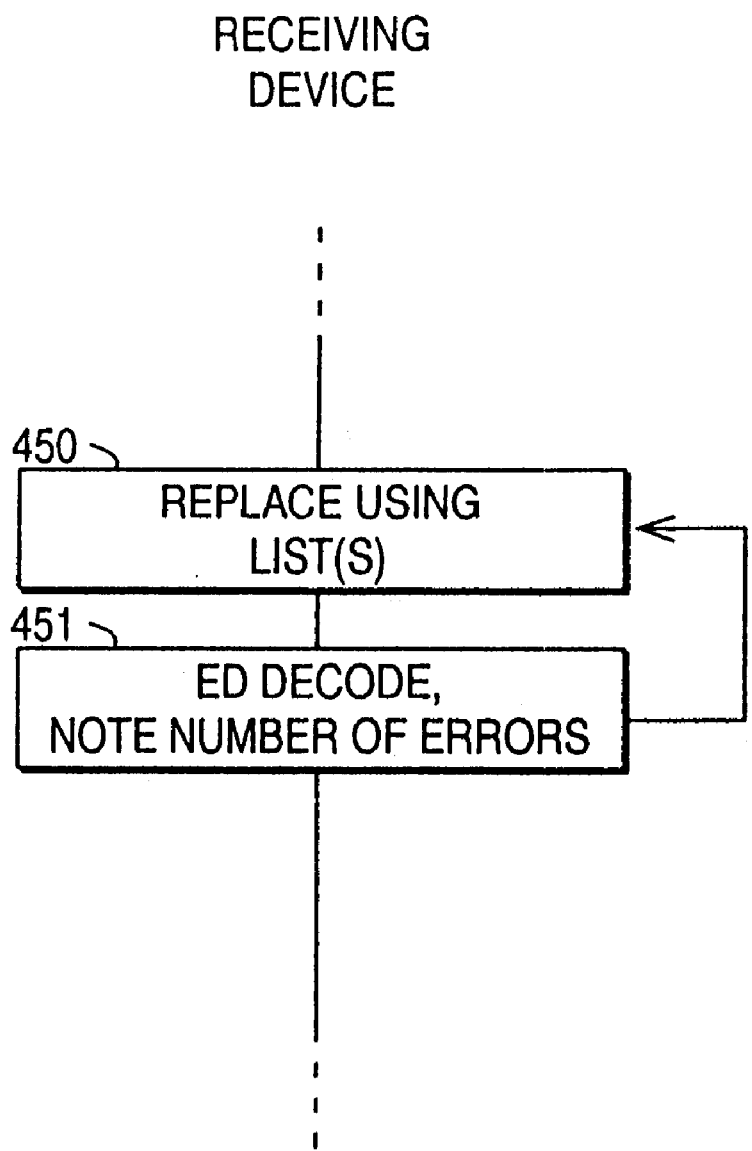
FIG. 4b is a potential addition to FIG. 4a, FIG. 5 illustrates a transmitter according to the invention

Step 450 of FIG. 4*b* corresponds to the receiving device trying to replace at least one decoded sequence representing a suspicious subpacket with an alternative sequence taken from the list of mutually alternative decoded sequences which the list decoding method has generated. State 451 corresponds to a subsequent new error detection decoding round. A loop may exist back from state 451 to state 450 if several subsequent replacements are to be tried. Numerous alternative strategies are available for the replacement at step 450 if there are several identified suspicious subpackets. First of them is the same which is taken when there is only one identified suspicious subpacket: start with exactly one suspicious subpacket (the one with the lowest primary reliability metric), replace the decoded sequence representing it with the immediately following candidate sequence from the corresponding list, then try the error detection decoding of the superpacket again to find out, whether the error was corrected by the replacement. If not, continue by taking subsequent candidate sequencies from the same list one at a turn. If none of the sequencies from the list give a satisfactory result in error detection decoding, only then apply for a retransmission. A second possible strategy is to make the replacement first with the subpacket with the lowest relibility metric, and if it does not help, cancel that replacement and try replacing the subpacket with the second lowest reliability metric. If the number of the identified suspicious subpackets is larger than one and the lists contain many candidate sequences, the number of possible permutations of the replacements becomes easily very large.

List decoding often saves time if the processing speed of the receiving device is high compared with the average rate of obtaining retransmissions. Therefore it may be advantageous to locate the steps 450 and 451 and the eventual loop between them between steps 407 and 408 in FIG. 4*a*. However, it may happen that the replacement procedure is unable to provide the error-free sequence and a retransmission is still needed; in such a case the time used for the replacement(s) has been wasted. One possible solution is to always ask for retransmissions if errors were detected, and while the receiving device waits for the retransmission to arrive, make replacement attempts in the meantime. In other words, steps 450 and 451 would take place simultaneously with steps 408 and 409 (and possibly 413). Such a solution is advantageous e.g. as an enhancement to a high-end product which has large reserves of processing capacity: the system specifications which apply to all products would call for the immediate retransmission request, but the high-end product may provide additional receiving speed and reliability by complementing the retransmission with a selected list decoding and replacement strategy.

Figure 5:
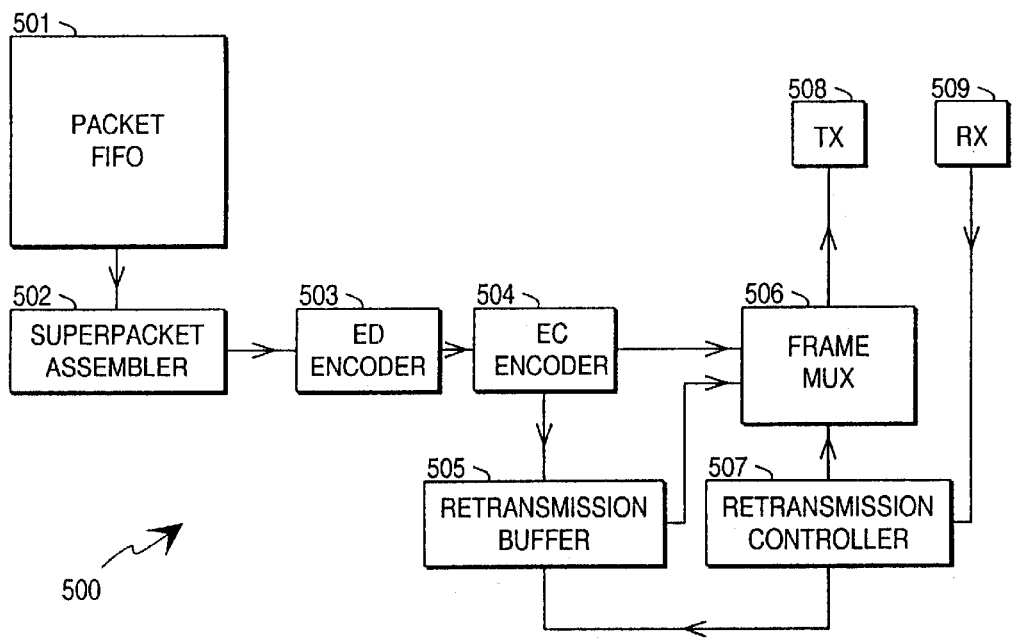

FIG. 5 is a schematic representation of a transmitting device 500 according to an advantageous embodiment of the invention. A FIFO (First In, First Out) type packet buffer 501 is used to temporarily store the subpackets to be transmitted. A superpacket composition buffer 502 is arranged to be filled up with a predetermined number of subpackets read from the packet buffer 501, and the resulting superpacket is arranged to be conducted through an error detection coder 503 and an error correction coder 504. A retransmission buffer 505 is arranged to temporarily store a copy of the information that is necessary for the potential retransmissions concerning each subpacket. A frame multiplexer 506 will arrange the original transmissions and required retransmissions into the frames of the physical layer frame structure in an optimal way, i.e. so that it tries to fill up each frame and simultaneously not to violate any rules concerning allowed transmission delays. A retransmission controller 507 keeps a record of the requested retransmissions and controls the operation of the retransmission buffer 505 and the frame multiplexer accordingly. A transmitter unit 508 takes care of the actual transmitting and a receiver unit 509 receives the retransmission requests and conveys them to the retransmission controller 507.

According to the invention the superpacket is composed prior to error detection coding and error correction coding, and the encoders 503 and 504 of the transmitting device are arranged not to pay attention to the boundaries between subpackets. However, the retransmission arrangement is arranged to operate on the basis on the subpackets, i.e. to recognise retransmission requests on the subpacket level and to introduce the necessary subpacket-level retransmission information to the transmissions of the transmitting device through the frame multiplexer 506 and the transmitter unit 508.

Figure 6:
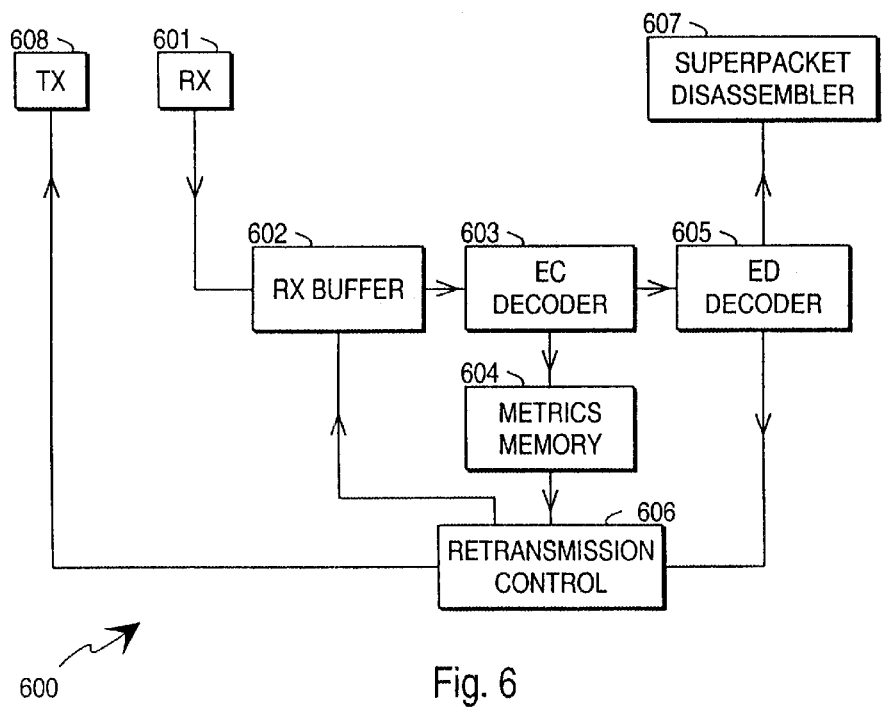
FIG. 6 illustrates a receiver according to the invention.

FIG. 6 is a schematic representation of a receiving device 600 according to an advantageous embodiment of the invention. A receiver unit 601 is arranged to physically receive the transmissions of the transmitting device and to convert them to a form suitable for decoding. A buffer memory 602 with an incorporated recombination logic (not separately shown) is used to temporarily store the undecoded superpackets to prepare for the potential introduction of retransmitted additional information and to take care of the actual recombination of the original superpacket and the retransmitted additional information. The output of the buffer memory is connected to an error correction decoder 603 which is arranged to perform the error correction decoding and to store the reliability metrics into a metrics memory 604. An error detection decoder 605 is further arranged to decode the error detection code and to announce the detection of errors (or even the number of detected errors) to the retransmission control unit 606. The error detection decoder 605 has also an output for outputting the error-free superpackets into a superpacket decomposition block 607 which is arranged to reconstruct the original data packets. The retransmission control unit 606 is arranged to generate retransmission requests when necessary on the basis of the information it obtains from the blocks 605 and 604 and to transmit the retransmission requests through a transmitter unit 608. The retransmission control unit 606 also controls the deletion of obsolete (decoded and declared error-free, or declared obsolete due to an expired time limit) superpackets from the buffer memory 602.

In a receiving device applying a list decoding method the error correction decoder 603 must comprise or have at its disposal a memory block for temporarily storing the lists of mutually alternative decoded sequences and their associated reliability metrics. Similarly the retransmission control unit 606 must be arranged to perform the replacements according to the selected replacement strategy either before any retransmission requests are sent or concurrently with them.

The specific embodiments of the invention discussed in the foregoing description are exemplary only and do not limit the applicability of the invention within the scope of the appended claims. A potential addition to the invention is the concurrent use of other measurements than just the calculation of reliability metrics to identify the suspicious subpackets. An example of such an addition is the use of a general signal to noise ratio, carrier to interference ratio or a similar widely known quality estimate of a radio connection. The receiving device may for example decide that if the signal to noise ratio is above a given threshold value, a CRC mismatch will always be interpreted as a single transmission error and consequently only one subpacket will be identified as suspicious. Lower values of the signal to noise ratio would then, according to a predefined function or look-up table, cause the CRC mismatch to be interpreted as an indication of a higher estimated number of errors, whereby a correspondingly larger number of subpackets should be identified as suspicious.

What is claimed is:

1. A method for reliably receiving digital information from a transmitting device, which information to be received
   appears in discrete subunits so that a predetermined number of subunits correspond to a superunit and
   appears in encoded form with a certain error detection code, corresponding to a certain error detection decoding method, and additionally with a certain error correction code, corresponding to a certain error correction decoding method;
the method comprising the steps of
   error correction decoding a superunit,
   during the error correction decoding, separately estimating the decoding reliability of each subunit of the superunit to be decoded,
   error detection decoding the error correction decoded superunit,
   during the error detection decoding, detecting whether or not there were errors in the superunit to be decoded, and
   if there were detected errors in the decoded superunit, arranging for partial corrective action on the decoded superunit on the basis of the estimated reliabilities of the subunits.

2. A method according to claim 1, wherein the step of arranging for partial corrective action on the decoded superunit corresponds to selective requesting of retransmissions and comprises the mutually alternative substeps a) and b) in which
   a) as a response to the number of detected errors in the decoded superunit being less than or equal to a predefined limiting value, retransmissions are not requested and
   b) as a response to the number of detected errors in the decoded superunit being greater than said predefined limiting value,
      at least one subunit is identified as suspicious on the basis of its estimated decoding reliability and the number of detected errors in the decoded superunit and
      retransmission is requested concerning the subunit(s) identified as suspicious.

3. A method according to claim 2, wherein said predefined limiting value is zero.

4. A method according to claim 2, wherein median or mean value based rules are applied to identify the suspicious subunit(s) so that
   each estimated decoding reliability is represented as a numerical reliability metric and
   the median or mean value of the reliability metrics is calculated;
and those subunits are identified as suspicious the reliability metric of which is less than or equal to a first predefined percentage of said median or mean value.

5. A method according to claim 2, wherein said predefined limiting value is greater than zero and median or mean value based rules are applied to identify the suspicious subunit(s) so that
   each estimated decoding reliability is represented as a numerical reliability metric,
   the median or mean value of the reliability metrics is calculated,
   the ratio of the number of detected errors in the decoded superunit to the number of subunits in a superunit is represented as an error ratio, and as mutually alternative substeps
   c) as a response to the error ratio being less than or equal to a first error threshold value, those subunits are identified as suspicious the reliability metric of which is less than or equal to a first metric threshold value,
   d) as a response to the error ratio being greater than said first error threshold value but less than or equal to a second error threshold value, those subunits are identified as suspicious the reliability metric of which is less than or equal to a second metric threshold value which is greater than said first metric threshold value or
   e) as a response to the error ratio being greater than said second error threshold value, all subunits of the superunit are identified as suspicious.

6. A method according to claim 2, wherein order of magnitude based rules are applied to identify the suspicious subunit(s) so that
   each estimated decoding reliability is represented as a numerical reliability metric,
   the subunits are arranged into an order of descending values of their reliability metrics and
   a predefined constant number of subunits with lowest values of their reliability metrics are identified as suspicious.

7. A method according to claim 2, wherein said predefined limiting value is greater than zero and order of magnitude based rules are applied to identify the suspicious subunit(s) so that each estimated decoding reliability is represented as a numerical reliability metric, the ratio of the number of detected errors in the decoded superunit to the number of subunits in a superunit is represented as an error ratio, and as mutually alternative substeps f) as a response to the error ratio being less than or equal to a first error threshold value, the subunit with the lowest reliability metric is identified as suspicious, g) as a response to the error ratio being greater than said first error threshold value but less than or equal to a second error threshold value, the half of the subunits with lowest reliability metrics are identified as suspicious or h) as a response to the error ratio being greater than said second error threshold value, all subunits of the superunit are identified as suspicious.

8. A method according to claim 2, wherein the number of the subunits of the superunit that are identified as suspicious depends on the number of retransmissions already requested concerning the current superunit.

9. A method according to claim 2, wherein the number of the subunits of the superunit that are identified as suspicious depends on a separately measured value describing the quality of the connection between the transmitting device and the receiving device.

10. A method according to claim 1, wherein the step of arranging for partial corrective action on the decoded superunit comprises the step of arranging for a copy of at least one subunit to be retransmitted.

11. A method according to claim 10, further comprising the steps of receiving the requested retransmitted copy of the subunit(s) previously identified as suspicious and replacing the subunit(s) previously identified as suspicious with the retransmitted copy.

12. A method according to claim 10, further comprising the steps of receiving the requested retransmitted copy of the subunit(s) previously identified as suspicious and diversity combining the retransmitted copy with the subunit(s) previously identified as suspicious.

13. A method according to claim 1, wherein the step of arranging for partial corrective action on the decoded superunit comprises the step of arranging for the transmission of additional parity bits.

14. A method according to claim 13, wherein said additional parity bits correspond to a subset of bits that were punctured from the originally received superunit.

15. A method according to claim 1, wherein the steps of error correction decoding a superunit and separately estimating the decoding reliability of each subunit comprises the substep of, for each subunit, providing a list of mutually alternative decoded bit sequences in an order of descending estimated decoding reliability, and the step of arranging for partial corrective action on the decoded superunit comprises the step of replacing at least one selected decoded bit sequence with another decoded bit sequence from the corresponding list.

16. A method for reliably transmitting digital information between a transmitting device and a receiving device, comprising the steps of arranging the digital information to be transmitted into discrete subunits and composing a superunit from a predetermined number of subunits, encoding said superunit continuously with a certain error detection code corresponding to a certain error detection decoding method, encoding said superunit continuously with a certain error correction code, corresponding to a certain error correction decoding method, transmitting the encoded superunit from the transmitting device to the receiving device, error correction decoding said superunit, during the error correction decoding, separately estimating the decoding reliability of each subunit of the superunit to be decoded, error detection decoding the error correction decoded superunit, during the error detection decoding, detecting whether or not there were errors in the superunit to be decoded, and if there were detected errors in the decoded superunit, arranging for partial corrective action on the decoded superunit on the basis of the estimated reliabilities of the subunits.

17. A transmitting device for reliably transmitting digital information in transmission frames, comprising buffering means for conjoining a predefined number of subunits of information into a superunit, error detection encoding means for error detection encoding the information to be transmitted, error correction encoding means for error correction encoding the information to be transmitted and retransmission means for providing retransmissions concerning selected portions of the information to be transmitted;

wherein the error detection encoding means and error correction encoding means are arranged to encode completely conjoined superunits, the retransmission means are arranged to provide retransmissions concerning selected subunits and the transmitting device further comprises multiplexing means for multiplexing encoded conjoined superunits and retransmissions concerning selected subunits into transmission frames.

18. A transmitting device according to claim 17, wherein the retransmission means are arranged to temporarily store a copy of each subunit in the form which it has as a part of an encoded conjoined superunit, and provide a replica of the stored copy as a retransmission concerning that subunit.

19. A transmitting device according to claim 17, wherein the error correction encoding means are arranged to apply a punctured code puncturing certain bits during the error correction encoding of the information to be transmitted, and the retransmission means are arranged to temporarily store copies of the punctured bits and to provide replicas of predefined subsets of the punctured bits of a certain subunit as a retransmission concerning that subunit.

20. A receiving device for reliably receiving encoded digital information in the form of superunits that consist of a predefined number of subunits, comprising error correction decoding means for error correction decoding a superunit and estimating the decoding reliability of each subunit contained within it, error detection decoding means for error detection decoding a superunit and detecting whether or not there were errors in it and retransmission control means for identifying, as a response to a nonzero number of errors detected in a decoded superunit, a predefined number of the subunits within the decoded superunit as suspicious on the basis of the estimated reliabilities of the subunits and for generating retransmission requests concerning the subunits identified as suspicious.

21. A receiving device according to claim 20, comprising diversity combination means for diversity combining the information contained within a previously received subunit and a retransmitted copy of the same subunit.

22. A receiving device according to claim 20, comprising parity bit combination means for combining the information contained within a previously received subunit and a received subset of parity bits additional to it.

* * * * *